April 6, 1937.   R. PERTHEL ET AL   2,076,384
BATTERY ELECTROLYTE INDICATOR
Filed Aug. 29, 1936
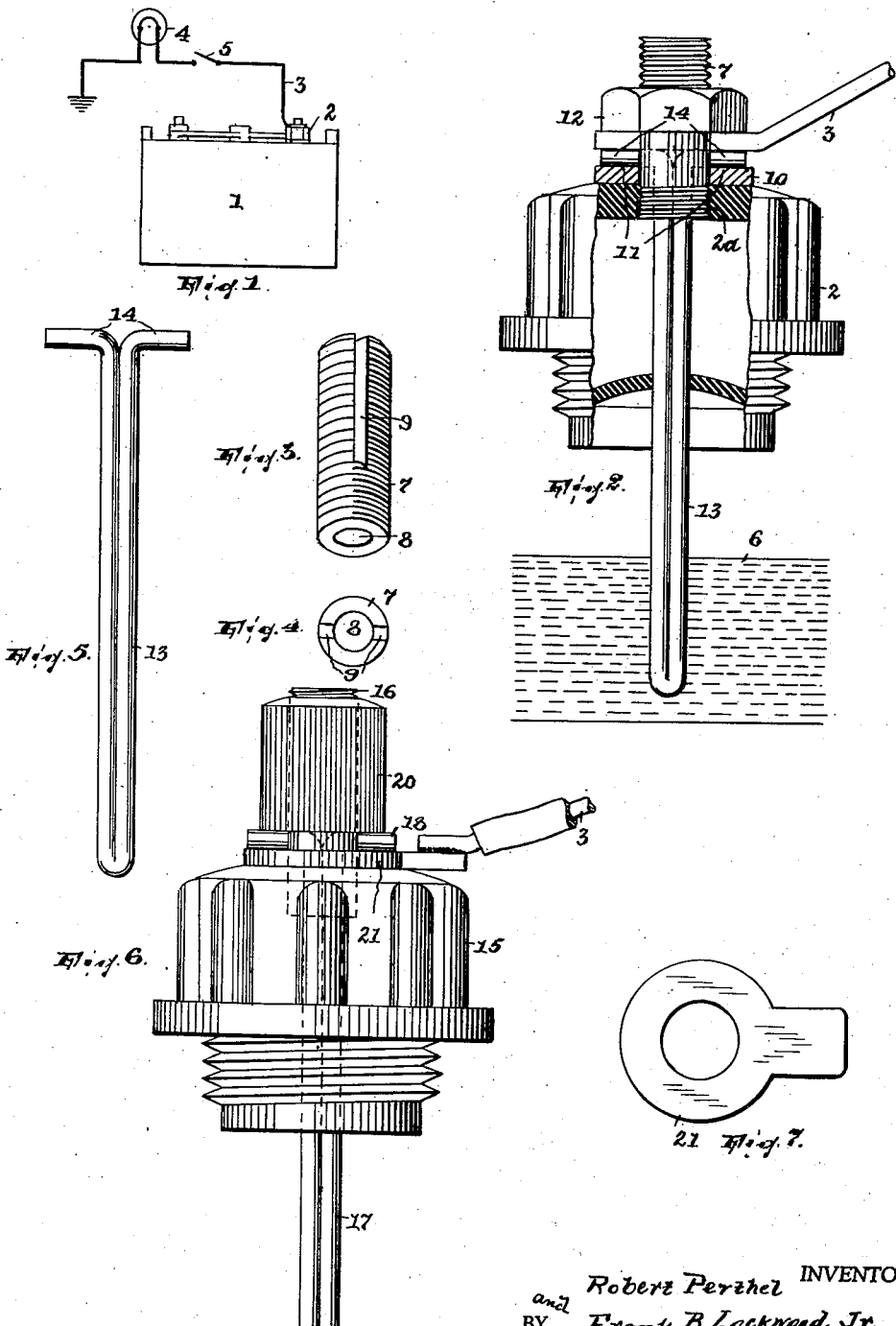
INVENTORS,
Robert Perthel
and
BY  Frank B. Lockwood, Jr.,
John W. Steward.
ATTORNEY.

Patented Apr. 6, 1937

2,076,384

UNITED STATES PATENT OFFICE 2,076,384

BATTERY ELECTROLYTE INDICATOR

Robert Perthel, Nutley, and Frank B. Lockwood, Jr., Clifton, N. J.

Application August 29, 1936, Serial No. 98,462

10 Claims. (Cl. 200—152)

This invention relates to electrolyte-level indicators for batteries. These usually comprise, with a conductor grounded at one end and containing some signal (as a lamp) and perhaps a circuit-closer, means to afford electrical connection between the other end of the conductor and the electrolyte, such means including some form of terminal associated with the battery cap and adapted to dip in the electrolyte. The circuit being otherwise closed the signal indicates that there is ample electrolyte present until the level of the latter falls below the terminal, whereupon the consequent interruption of the circuit causes the signal to cease functioning and thus notifies the owner that water should be added to the electrolyte.

The invention more particularly relates to that part of the indicator system which directly includes the said means for affording the electrical connection between the conductor and the electrolyte, and it consists in a novel construction of said means whereby, without undue expense, it may be applied to any standard type of battery cap, and also in a novel combination of said means and the cap. The invention further involves the possibility that the terminal forming a part of said means may be manipulated for the purpose of adjusting the extent to which it depends from the cap so that the signal will cease to function early or late in the subsidence of the electrolyte or to suit batteries in which the elevation of the cap varies with respect to a given electrolyte level.

In the drawing,

Fig. 1 is a side elevation, more or less diagrammatic, of an electrolyte-level indicator embodying the present invention;

Fig. 2 shows one form of the means of this invention with the electrolyte and the battery cap, the latter appearing partly in section;

Fig. 3 is an isometric view of the post and Fig. 4 an upper end view thereof;

Fig. 5 shows the terminal in side elevation;

Fig. 6 is a side elevation of another form of said means and the cap, assembled; and Fig. 7 shows the conducting collar used with this form.

1 is a battery of standard type and 2 one of its caps, screwed therein. 3 is the conductor leading from ground as shown and including a signal 4, here a lamp, and preferably a circuit-closer 5. The means to connect the conductor and the electrolyte is as follows, referring, first, to Figs. 1 to 4.

The cap 2 has a central threaded passage 2a, as shown, and into this is screwed a post 7 the lower and upper ends of which are threaded while its mid-portion is left plain so as to afford a stop to limit the screwing-in of the post. The post has an axial bore 8 and from its upper to near its lower end it is bifurcated or formed with opposite slots 9. There may be a washer 10 resting on the cap and penetrated by the post, this being especially desirable if the top of the cap should be rounded. With the cap structure thus formed, which affords seats at 11, coacts means for effecting clamping pressure, such means here taking the form of a nut 12 screwed on the upper end of the post. A terminal is provided which extends down through the bore of the post so as to dip in the electrolyte and which has at least one lateral extension protruding from the post (i. e., through slot 9) over a seat 11. This in the present example comprises a shank 13 having the opposite extensions 14, thus giving the terminal a T-shaped form. It is here formed of wire, preferably flexible, as of lead, and is given the form stated by folding the wire midway its length and then bending off oppositely its end portions at proper points so as to produce a shank of the elected length and which will dip into the electrolyte. Since the post is in the example slotted as described and so may receive the terminal extensions when the shank is passed through the bore of the post the shank may be assembled with the post, already shaped; thereupon, the conductor end being made to lap at least one of the extensions (in the example it laps both of them by being in the slots and in overlying relation to the extensions), the nut may be screwed down so as by a clamping action to effect electrical connection between the conductor and terminal.

Where, as shown, the conductor end is extended into the slots of the post the turning of the cap structure, as in removing it from or returning it to the cell, would be encumbered by the conductor. Wherefore we have devised the construction shown by Figs. 6 and 7.

Here the cap structure, formed by the cap 15 and post 16, the terminal having the shank 17 and extensions 18 and the nut 20, are or may be all substantially the same as already described, but there is also provided an electroconductive collar 21 freely penetrated by the post and to which the conductor end may be soldered. Upon loosening the nut the collar exists in effect swivelled to the cap structure, permitting the latter to be turned without the turning being encumbered by the conductor.

Having thus fully described my invention what I claim is:

1. An assembly for the purpose described including a battery cap structure, a terminal extending down through the cap structure and having a lateral extension, and means on the cap structure coactive therewith to clamp together said extension and the end of an electric-circuit conductor.

2. An assembly for the purpose described including a battery cap structure having an upstanding post, a terminal extending down through the cap structure and having a lateral extension, and means on the post coactive with the cap structure to clamp together said extension and the end of an electric-circuit conductor.

3. An assembly for the purpose described including a battery cap structure having an upstanding post, a terminal extending down through the cap structure and its post and having an extension protruding laterally from the post, and means on the post coactive with the cap structure to clamp together said extension and the end of an electric-circuit conductor.

4. An assembly for the purpose described including a battery cap structure having an upstanding post, a terminal extending down through the cap structure and its post and having extensions protruding in different radial directions from the post, and means on the post coactive with the cap structure to clamp together said extensions and the end of an electric-circuit conductor.

5. The assembly set forth in claim 3 characterized by said post having a slot extending down from its upper end and through which the extension protrudes from the post.

6. The assembly set forth in claim 4 characterized by said post having slots extending down from its upper end and through which the extensions protrude from the post.

7. An assembly for the purpose described including a battery cap structure having an upstanding post, a terminal extending down through the cap structure and its post and having a lateral extension protruding from the post, an electro-conductive collar penetrated by the post, and means on the post coactive with the cap structure to clamp together said extension and collar.

8. In combination, a post to be rigidly secured at one end thereof in a passage penetrating the top of a battery cap, a terminal extending lengthwise of and through and depending from the post and having an extension protruding laterally through and from the post, and means on the post to coact with the cap to clamp together said extension and the end of an electro-circuit conductor.

9. In combination, a post to be rigidly secured at one end thereof in a passage penetrating the top of a battery cap, a terminal extending lengthwise of and through and depending from the post and having extensions protruding in different radial directions through and from the post, and means on the post to coact with the cap to clamp together said extensions and the end of an electric-circuit conductor.

10. In combination, a post to be rigidly secured at one end thereof in a passage penetrating the top of a battery cap, a terminal extending lengthwise of and through and depending from the post and having an extension protruding laterally through and from the post, an electro-conductive collar penetrated by the post, and means to coact with the cap to clamp together the extension and collar.

ROBERT PERTHEL.
FRANK B. LOCKWOOD, Jr.